United States Patent
Park et al.

(10) Patent No.: US 12,272,235 B2
(45) Date of Patent: Apr. 8, 2025

(54) SERVER AND METHOD OF CONTROLLING THE SAME

(71) Applicants: Hyundai Motor Company, Seoul (KR); Kia Corporation, Seoul (KR)

(72) Inventors: Minjae Park, Seongnam-si (KR); Jong Bok Lee, Yongin-si (KR); Seunghyun Woo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 634 days.

(21) Appl. No.: 17/507,337

(22) Filed: Oct. 21, 2021

(65) Prior Publication Data
US 2022/0207999 A1  Jun. 30, 2022

(30) Foreign Application Priority Data

Dec. 30, 2020 (KR) .......................... 10-2020-0187102

(51) Int. Cl.
*G08G 1/01* (2006.01)

(52) U.S. Cl.
CPC ......... *G08G 1/0145* (2013.01); *G08G 1/0112* (2013.01); *G08G 1/0133* (2013.01)

(58) Field of Classification Search
CPC .. G08G 1/0145; G08G 1/0112; G08G 1/0133; G08G 1/202; G06Q 10/063; G06Q 30/0202; G06Q 30/0645; G06Q 50/40; G06Q 50/10; G07F 17/0057
See application file for complete search history.

(56) References Cited

U.S. PATENT DOCUMENTS

| 2020/0117216 A1* | 4/2020 | Sugimura ........ G06Q 10/06315 |
| 2021/0096564 A1* | 4/2021 | Panigrahi ............... G08G 1/205 |
| 2021/0233198 A1* | 7/2021 | Wells .................... H04L 67/306 |

FOREIGN PATENT DOCUMENTS

CN  111213031 A  *  5/2020

OTHER PUBLICATIONS

Fernandes, A Decision Support System for the Management of Smart Mobility Services (Year: 2020).*

* cited by examiner

*Primary Examiner* — Elaine Gort
*Assistant Examiner* — Chanmin Park
(74) *Attorney, Agent, or Firm* — Slater Matsil, LLP

(57) ABSTRACT

An embodiment server includes a communicator and a processor configured to receive image data from a personal mobility through the communicator, determine movement direction information including departure area information of the personal mobility and arrival area information of the personal mobility based on the image data, predict a demand level for the personal mobility for each area based on the movement direction information, and set a service area of the personal mobility based on the demand level.

18 Claims, 8 Drawing Sheets

SERVER AND METHOD OF CONTROLLING THE SAME

CROSS-REFERENCE TO RELATED APPLICATIONS

This application claims the benefit of Korean Patent Application No. 10-2020-0187102, filed on Dec. 30, 2020, which application is hereby incorporated herein by reference.

TECHNICAL FIELD

The present disclosure relates to a server and a method of controlling the same.

BACKGROUND

Recently, with an increase in the market for a personal mobility, which is an electricity-driven single person transportation device, the number of people using a personal mobility is gradually increasing.

In addition, a personal mobility operator provides a service for renting and returning a personal mobility within a certain service area, and sets the service area in consideration of the demand for the personal mobility, relocation of the personal mobility, and the like.

A user performing relocation of a personal mobility may identify a location and quantity of the personal mobility recommended on an application, and relocate or arrange the personal mobility for the quantity in a corresponding location.

However, predicting demand using only location information of the personal mobility and determining a location and quantity of the personal mobility for relocating is inaccurate.

SUMMARY

The present disclosure relates to a server and a method of controlling the same. Particular embodiments relate to a server for setting a service area of a personal mobility and a method of controlling the same.

Embodiments of the present disclosure provide a server capable of determining a movement direction of a personal mobility and predicting a demand level for each area based on the movement direction.

Additional embodiments of the disclosure will be set forth in part in the description which follows and, in part, will be obvious from the description, or may be learned by practice of the disclosure.

In accordance with an embodiment of the present disclosure, a server includes a communicator and a processor configured to receive image data from a personal mobility through the communicator, determine movement direction information including departure area information of the personal mobility and arrival area information of the personal mobility based on the image data, predict a demand level for the personal mobility for each area based on the movement direction information, and set a service area of the personal mobility based on the demand level.

The processor may be configured to identify the number of personal mobilities in which an area to which the personal mobility arrives is a first area based on the arrival area information of the personal mobility, and when the identified number of personal mobilities is greater than a first value, predict that the demand level for a personal mobility in the first area decreases.

The processor may be configured to identify the number of personal mobilities in which an area from which the personal mobility departs is a second area based on the departure area information of the personal mobility, and when the identified number of personal mobilities is greater than a second value, predict that the demand level for the personal mobility in the second area decreases.

The server may further include a display, wherein the processor is configured to display the demand level for a personal mobility for each area, on the display.

The processor may be configured to compare a distance between the personal mobility located in an area where the demand level decreases and an area where the demand level increases, and set the service area of the personal mobility based on the comparison result.

The processor may be configured to receive traffic information through the communicator, identify surrounding situations information of the personal mobility based on the traffic information, and predict the demand level for the personal mobility for each area based on at least one of a plurality of surrounding situations information.

The processor may be configured to identify usage information of the personal mobility based on the image data, and predict the demand level for the personal mobility for each area based on the usage information.

The processor, based on the usage information, may be configured to identify at least one of a ratio of the number of personal mobilities that users move without riding to the number of personal mobilities on which users are riding and traveling, a ratio of the number of personal mobilities that are slower than a moving speed of a pedestrian to the number of personal mobilities that are faster than the moving speed of the pedestrian, and a ratio of the number of personal mobilities on which two or more users are riding to the number of personal mobilities on which one user is riding.

The processor, based on the usage information, may be configured to predict that the demand level for the personal mobility decreases, in at least one of the cases when the ratio of the number of personal mobilities that users move without riding to the number of personal mobilities on which users are riding and traveling is greater than or equal to a predetermined first ratio and when the ratio of the number of personal mobilities that are slower than the moving speed of the pedestrian to the number of personal mobilities that are faster than the moving speed of the pedestrian is greater than or equal to a predetermined second ratio.

The processor may be configured to predict that the demand level for the personal mobility increases when the ratio of the number of personal mobilities on which two or more users are riding to the number of personal mobilities on which one user is riding is greater than or equal to a predetermined third ratio.

The server may predict the demand level for the personal mobility for each area based on an amount of use of the personal mobility by time zone and rental and return location information of the personal mobility by time zone.

In accordance with another embodiment of the present disclosure, a method of controlling a server includes receiving image data from a personal mobility through a communicator, determining movement direction information including departure area information of the personal mobility and arrival area information of the personal mobility based on the image data, predicting a demand level for the personal mobility for each area based on the movement direction information, and setting a service area of the personal mobility based on the demand level.

The method may further include identifying the number of personal mobilities in which an area to which the personal mobility arrives is a first area based on the arrival area information of the personal mobility, and predicting that the demand level for a personal mobility in the first area decreases when the identified number of personal mobilities is greater than a first value.

The method may further include identifying the number of personal mobilities in which an area from which the personal mobility departs is a second area based on the departure area information of the personal mobility, and predicting that the demand level for the personal mobility in the second area decreases when the identified number of personal mobilities is greater than a second value.

The method may further include displaying the demand level for a personal mobility for each area.

The method may further include comparing a distance between the personal mobility located in an area where the demand level decreases and an area where the demand level increases, and setting the service area of the personal mobility based on the comparison result.

The method may further include receiving traffic information, identifying a plurality of surrounding situations information of the personal mobility based on the traffic information, and predicting the demand level for the personal mobility for each area based on at least one of the plurality of surrounding situations information.

The method may further include identifying usage information of the personal mobility based on the image data, and predicting the demand level for the personal mobility for each area based on the usage information.

The method may further include identifying, based on the usage information, at least one of a ratio of the number of personal mobilities that users move without riding to the number of personal mobilities on which users are riding and traveling, a ratio of the number of personal mobilities that are slower than a moving speed of a pedestrian to the number of personal mobilities that is faster than the moving speed of the pedestrian, and a ratio of the number of personal mobilities on which two or more users are riding to the number of personal mobilities on which one user is riding.

The method may further include predicting, based on the usage information, that the demand level for the personal mobility decreases, in at least one of the cases when the ratio of the number of personal mobilities that users move without riding to the number of personal mobilities on which users are riding and traveling is greater than or equal to a predetermined first ratio and when the ratio of the number of personal mobilities that are slower than the moving speed of the pedestrian to the number of personal mobilities that are faster than the moving speed of the pedestrian is greater than or equal to a predetermined second ratio.

The method may further include predicting that the demand level for the personal mobility increases, when the ratio of the number of personal mobilities on which two or more users are riding to the number of personal mobilities on which one user is riding is greater than or equal to a predetermined third ratio.

The method may further include predicting the demand level for the personal mobility for each area based on an amount of use of the personal mobility by time zone, and rental and return location information of the personal mobility by time zone.

BRIEF DESCRIPTION OF THE DRAWINGS

These and/or other embodiments of the disclosure will become apparent and more readily appreciated from the following description of the exemplary embodiments, taken in conjunction with the accompanying drawings, in which.

DETAILED DESCRIPTION OF ILLUSTRATIVE EMBODIMENTS

Reference will now be made in detail to the embodiments of the present disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software or hardware. Further, a plurality of 'parts', 'modules', 'members', 'blocks' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described in detail with reference to the accompanying drawings.

Figure 1:
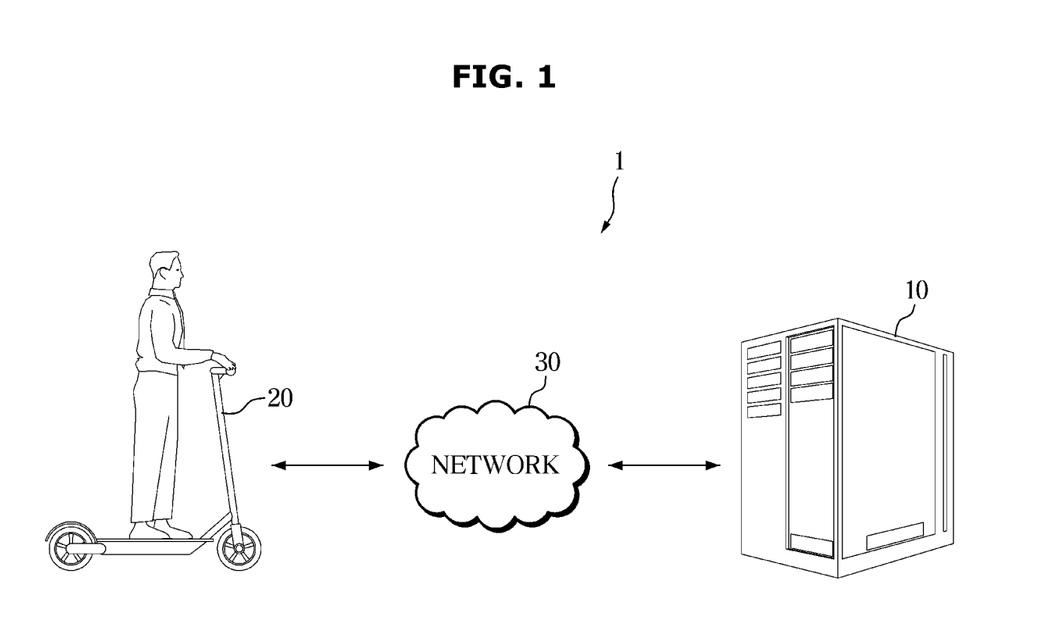
FIG. 1 is a block diagram showing a configuration of a service area setting system including a personal mobility and a server according to an embodiment.

FIG. 1 is a block diagram showing a configuration of a service area setting system including a personal mobility and a server according to an embodiment of the present disclosure.

Referring to FIG. 1, according to the embodiment, a service area setting system 1 includes a server 10, a personal mobility 20, and a network 30.

The server 10 may determine movement direction information including departure area information of the personal mobility 20 and arrival area information of the personal mobility 20 based on image data received from the personal mobility 20, predict a demand level for the personal mobility 20 based on the movement direction information, and set a service area for the personal mobility based on the demand level for each area.

To this end, the server 10 may perform a wireless communication with the personal mobility 20 via the network 30. The server 10 may communicate with the network 30 in a wired or a wireless manner. In this case, a known communication technique may be used for the wired communication and the wireless communication.

The personal mobility 20 is an electricity-driven single person transportation device, and may include a power wheel, an electric kickboard, an electric bicycle, an ultra-compact electric vehicle, and the like. The type of the personal mobility 20 is not limited to the above examples and may be variously provided as long as it is capable of serving a single person transportation device that operates on electricity.

The personal mobility 20 may perform wireless communication with the server 10 via the network 30, and may transmit image data to the server 10.

The network 30 may support communication between the server 10 and the personal mobility 20, and may include at least one of a telecommunications network, for example, a computer network (e.g., a local area network (LAN) or a wide area network (WAN)), the Internet, or a telephony network. However, the type of the network 30 is not limited to the above examples, and may be variously provided as long as it is capable of supporting communication.

Figure 2:
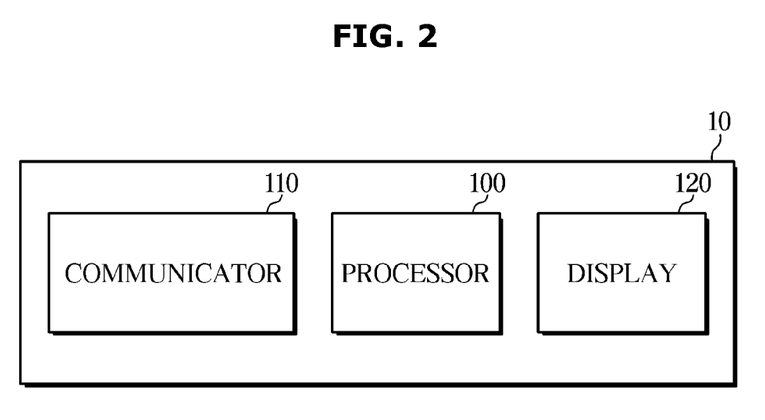
FIG. 2 is a block diagram showing a server according to an embodiment.

FIG. 2 is a block diagram showing a server according to an embodiment.

Referring to FIG. 2, the server 10 may include a communicator 110 and a processor 100. The processor 100 receives image data from the personal mobility 20 via the communicator 110, determines movement direction information including departure area information of the personal mobility 20 and arrival area information of the personal mobility 20 based on the image data, predicts a demand level of the personal mobility 20 for each area based on the movement direction information, and sets a service area for the personal mobility based on the demand level for each area.

The communicator 110 may be connected to the network 30 in a wired or wireless manner to transmit and receive data to/from the personal mobility 20. For example, the communicator 110 may receive the image data from the personal mobility 20.

In particular, the image data may include a captured image of in front of and around the personal mobility 20, and may be acquired from a camera provided in the personal mobility 20.

In response to identifying that the personal mobility 20 deviates from the service area based on a global positioning system (GPS), the server 10 may limit functions of the personal mobility 20. For example, the server 10 may limit the functions of the personal mobility 20 presenting outside the service area, for example, by limiting the return of the personal mobility 20 or limiting the speed of the personal mobility 20.

The display 120 may display the demand level for each area.

A storage (not shown) for storing a variety of information required for controlling the server 10 may be provided. Specifically, the storage may store location information of the personal mobility 20, an amount of use of the personal mobility 20 by time zone, rental and return location information of the personal mobility 20 by time zone, and rental and returned quantities of the personal mobility 20.

The processor 100 may collect movement direction information including departure area information and arrival area information of the personal mobility 20 based on the GPS information and the image data received from the personal mobility 20.

The processor 100 may identify an area to which the personal mobility 20 arrives based on the arrival area information of the personal mobility 20. The processor 100 may determine the number of personal mobilities 20 in an area to which the personal mobility 20 arrives, which may be a first area.

The processor 100 may compare the number of personal mobilities 20 in which the arrival area is the first area to a predetermined first value. When the number of personal mobilities 20 in which the arrival area is the first area is greater than the first value, the processor 100 may predict that the demand level for the personal mobility 20 in the first area decreases.

The processor 100 may identify an area from which the personal mobility 20 departs based on the departure area information of the personal mobility 20. The processor 100 may determine the number of personal mobilities 20 in the area from which the personal mobility 20 departs, which may be a second area.

The processor 100 may compare the number of personal mobilities 20 in which the departure area is the second area to a predetermined second value. When the number of personal mobilities 20 from which the departure area is the second area is greater than the second value, the processor 100 may predict that the demand level for the personal mobility 20 in the second area increases.

In other words, the first area to which a lot of the personal mobilities 20 arrive may be predicted to have less additionally required personal mobilities due to a large amount of returns of personal mobilities, and the second area from which a lot of the personal mobilities 20 depart may be predicted to have more additionally required personal mobilities 20 due to a large amount of rentals of personal mobilities.

In an embodiment, the processor 100 may determine the number of additionally required personal mobilities 20 in the first area in which the demand level increases. The processor 100 may determine the number of personal mobilities 20 located in the second area in which the demand decreases, and then determine the number of personal mobilities 20 capable of moving to another area.

The processor 100 may display the first area in which the demand level increases and the second area in which the demand level decreases, on the display 120. Particularly, the first area in which the demand level for the personal mobility 20 increases may be displayed in red, and the second area in which the demand level for the personal mobility 20 decreases may be displayed in blue, but according to an embodiment, as long as a user is capable of intuitively determining the demand level for the personal mobility 20, various display methods may be used.

Furthermore, the processor 100 may display the number of personal mobilities 20 required in the first area in which the demand level increases, on the display 120. The processor 100 may display on the display 120 the number of personal mobilities 20 capable of moving to the first area in the second area in which the demand level decreases.

The processor 100 may identify location information of the personal mobility 20 located in the area in which the demand level decreases. The processor 100 may determine a distance between the personal mobility 20 located in an area where the demand level decreases and an area where the demand level increases.

The processor 100 may set a service area such that the personal mobility 20 having a short distance between the personal mobility 20 located in the area where the demand level decreases and the area where the demand level increases is relocated to an area where the demand increases.

In other words, based on a short distance and a direction, the personal mobility 20 may be relocated to areas where the demand level increases, so that the service area of the personal mobility 20 may be set as a more efficient movement line.

The processor 100 may identify usage information of the personal mobility 20 based on the GPS location information and the image data.

Herein, the usage information of the personal mobility 20 may include at least one of the number of personal mobilities 20 on which users are riding and traveling, the number of personal mobilities 20 that users move without riding, the number of personal mobilities 20 that are slower than a moving speed of a pedestrian, the number of personal mobilities 20 on which one user is riding, and the number of personal mobilities 20 on which two or more users are riding.

In this case, the personal mobility 20 that the user moves without riding may refer to the personal mobility 20 the user pushes without riding.

The processor 100, based on the usage information of the personal mobility 20, may identify at least one of a ratio of the number of personal mobilities 20 that users move without riding to the number of personal mobilities 20 on which users are riding and traveling, a ratio of the number of personal mobilities 20 that are slower than the moving speed of the pedestrian to the number of personal mobilities 20 that are faster than the moving speed of the pedestrian, and a ratio of the number of personal mobilities 20 on which two or more users are riding to the number of personal mobilities 20 on which one user is riding.

For example, in a specific area, if the ratio of the number of personal mobilities 20 that users move without riding to the number of personal mobilities 20 on which users are riding and traveling is greater than or equal to a predetermined first ratio (e.g., 30%), the processor 100 may determine that the area is difficult to ride and travel on the personal mobility 20 due to an influence of the surrounding environment, resulting in predicting that the demand level for the personal mobility 20 in the area decreases.

For example, in a specific area, if the ratio of the number of personal mobilities 20 that are slower than the moving speed of the pedestrian to the number of personal mobilities 20 that are faster than the moving speed of the pedestrian is greater than or equal to a predetermined second ratio (e.g., 50%), the processor 100 may determine that the area is difficult to ride and travel on the personal mobility 20 due to the influence of the surrounding environment, resulting in predicting that the demand level for the personal mobility 20 in the area decreases.

For example, in a specific area, if the ratio of the number of personal mobilities 20 on which two or more users are riding to the number of personal mobilities 20 on which one user is riding is greater than or equal to a predetermined third ratio (e.g., 20%), the processor 100 may identify that two users are riding because the number of personal mobilities 20 is insufficient, resulting in predicting that the demand level for the personal mobility 20 in the area increases.

The processor 100 may receive traffic information via the communicator 110. The processor 100 may determine surrounding situations information of the personal mobility 20 based on the traffic information.

Herein, the traffic information may include a road traffic volume, a degree of flow, a road congestion situation, a penetration rate of public transportation, a flow amount of public transportation, the number of stops, a location, and the like.

For example, based on the surrounding situation information and the image data received from the personal mobility 20 in a specific area, the processor 100 may identify at least one of the number of pedestrians in the area where the personal mobility 20 is located, the moving speed of the pedestrians, the number of vehicles, the speed of the vehicles, and the speed of a bicycle.

For example, in at least one of the cases, that is, when the number of pedestrians in an area where the personal mobility 20 is located in a specific area is less than a predetermined number, when the moving speed of pedestrians is faster than a predetermined speed, when the number of vehicles is less than a predetermined number, when the speed of the vehicles is slower than a predetermined speed, or when the speed of the bicycle is faster than a predetermined speed, the processor 100 may predict a specific area as an area where the demand level for the personal mobility 20 increases.

For example, in at least one of the cases, that is, when the number of pedestrians in an area where the personal mobility 20 is located in a specific area is greater than the predetermined number, when the number of vehicles is greater than the predetermined number, when the speed of the vehicles is faster than the predetermined speed, or when the speed of the bicycle is slower than the predetermined speed, the processor 100 may predict a specific area as an area where the demand level for the personal mobility 20 decreases.

The processor 100, based on the surrounding situations information, when the speed limit of the road in a specific area is 80 km/h or more, or when the penetration rate of surrounding public transportation and the number of stops are more than a predetermined number, the specific area may be predicted as an area where the demand level for the personal mobility 20 decreases.

The processor 100, based on the surrounding situations information, when the speed limit of the road in a specific area is less than 80 km/h, or when the penetration rate of surrounding public transportation and the number of stops are less than the predetermined number, a specific area may be predicted as an area where the demand level for the personal mobility 20 increases.

The processor 100 may predict the demand level for each area based on at least one of the amount of use of the personal mobility 20 by time zone, the rental and return location information of the personal mobility 20 by time zone, and the rental and returned quantities of the personal mobility 20, which are stored in the storage (not shown).

Figure 3A:
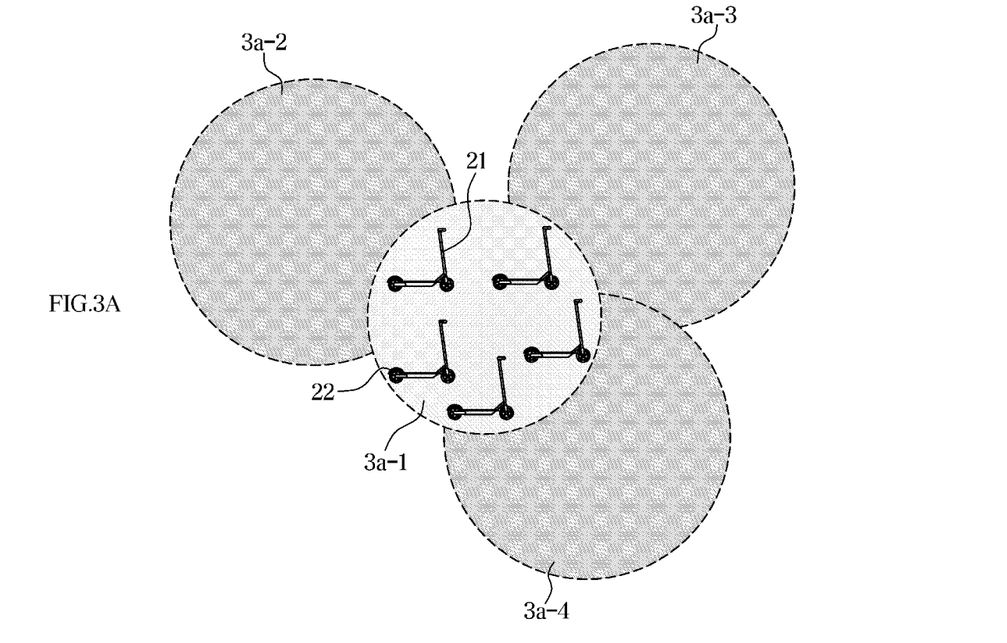
FIGS. 3A and 3B are views illustrating a method for setting a service area of a personal mobility according to an embodiment.
Figure 3B:
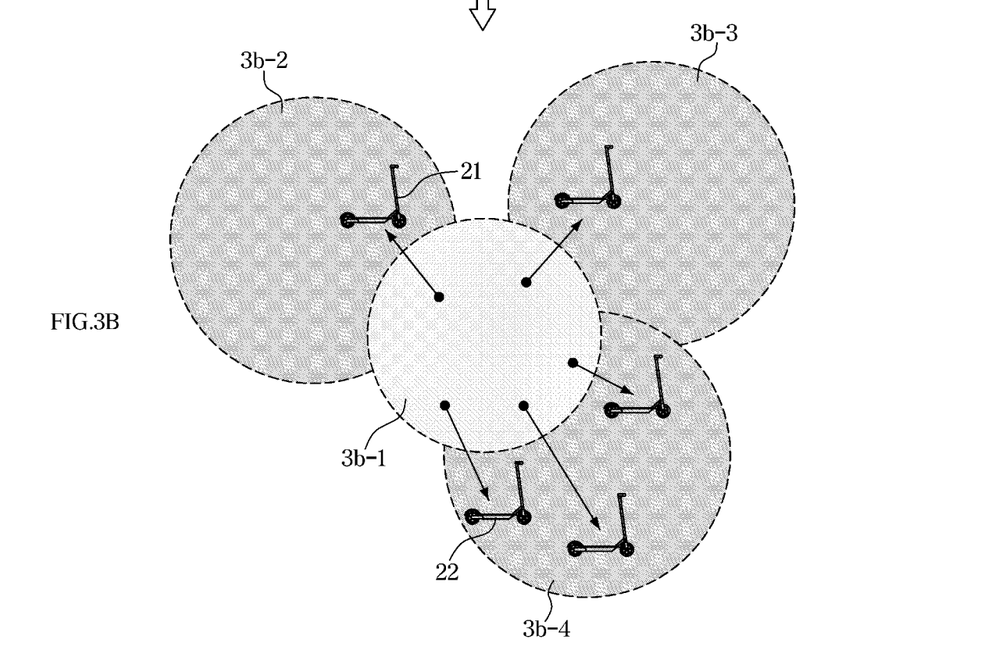

FIGS. 3A and 3B are views illustrating a method for setting a service area of a personal mobility according to an embodiment.

Referring to FIG. 3A, a first area 3a-1 where the personal mobilities 21 and 22 are located may be an area where the demand level is predicted to decrease, and a second area 3a-2, a third area 3a-3, and a fourth area 3a-4 may be areas where the demand level for the personal mobility 20 is predicted to increase.

Referring to FIG. 3B, the server 10 may set the service area of the personal mobilities 21 and 22 from an area 3b-1 where the demand level is predicted to decrease to a second area 3b-2, a third area 3b-3, and a fourth area 3b-4 where the demand level is predicted to increase. The server 10 may relocate the personal mobilities 21 and 22 from the first area 3b-1 to the second area 3b-2, the third area 3b-3, and the fourth area 3b-4.

As shown in FIG. 3B, the server 10 may relocate the personal mobility 21 to the second area 3b-2, which is closest to the personal mobility 21, among the second area 3b-2, the third area 3b-3, and the fourth area 3b-4 where the demand level is predicted to increase.

As shown in FIG. 3B, the server 10 may relocate the personal mobility 22 to the fourth area 3b-4, which is closest to the personal mobility 22, among the second area 3b-2, the third area 3b-3, and the fourth area 3b-4 where the demand level is predicted to increase.

As such, by relocating the personal mobility 20 based on the short distance and the direction between the personal mobility 20 and the area where the demand level is predicted to increase, the service area of the personal mobility 20 may be set as a more efficient movement line.

Figure 4:
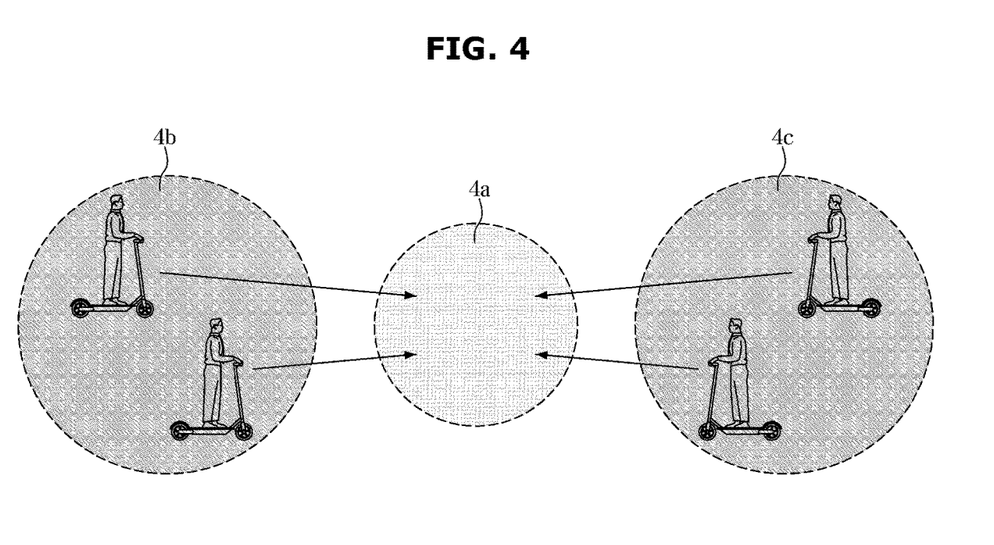
FIG. 4 is a view illustrating a method for setting a service area of a personal mobility according to another embodiment.

FIG. 4 is a view illustrating a method for setting a service area of a personal mobility according to another embodiment.

Referring to FIG. 4, the server 10 may determine the movement direction of the personal mobility 20 based on the image data received from the personal mobility 20, and then identify the departure area of the personal mobility 20 in consideration of the movement direction.

For example, the server 10 may identify an area from which the personal mobility 20 departs. The server 10 may predict areas 4b and 4c in which the personal mobility 20 departs with a number greater than a first value as an area where the demand level for the personal mobility 20 increases.

As such, since the areas 4b and 4c from which the personal mobility 20 departs a lot have a lot of personal mobility rentals, a lot of additionally required personal mobilities 20 may be predicted.

Referring to FIG. 4, the server 10 may determine the movement direction of the personal mobility 20 based on the image data received from the personal mobility 20, and then identify the arrival area of the personal mobility 20 in consideration of the movement direction.

For example, the server 10 may identify the area to which the personal mobility 20 arrives. The server 10 may predict an area 4a in which the personal mobility 20 arrives with a number greater than a second value as an area where the demand level for the personal mobility 20 decreases.

As such, since the area 4a to which the personal mobility 20 arrives a lot has a lot of personal mobility returns, less additionally required personal mobilities 20 may be predicted.

Figure 5A:
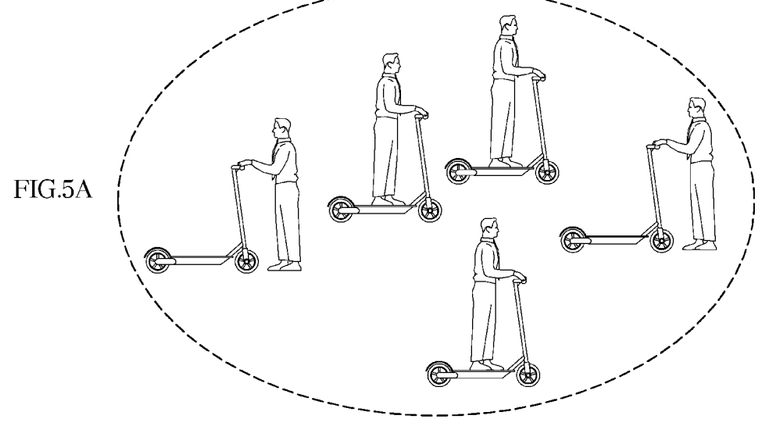
FIGS. 5A to 5C are views illustrating a method for setting a service area of a personal mobility according to another embodiment.
Figure 5B:
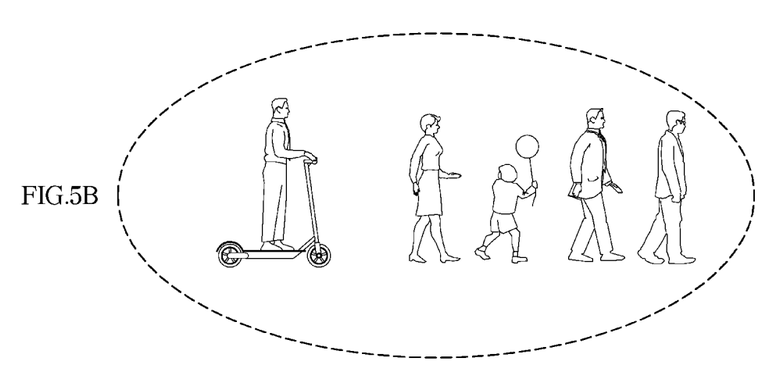
Figure 5C:
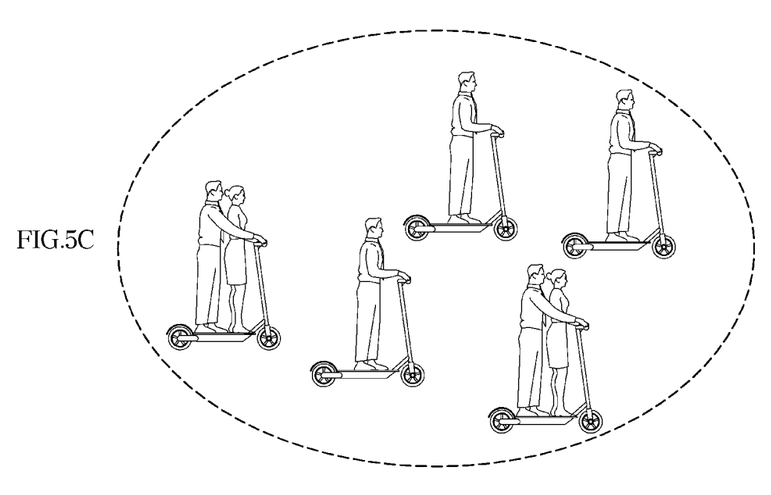

FIGS. 5A to 5C are views illustrating a method for setting a service area of a personal mobility according to another embodiment.

Referring to FIGS. 5A to 5C, the server 10 may determine usage information of the personal mobility 20 based on the image data received from the personal mobility 20.

For example, as shown in FIG. 5A, the server may identify the usage information about when the user is riding and traveling on the personal mobility 20, or when the user does not ride the personal mobility 20 and moves by pushing.

In particular, in the area shown in FIG. 5A, when the ratio of the number of personal mobilities 20 that the users move without riding to the number of personal mobilities 20 that the users are riding and traveling on is greater than or equal to the predetermined first ratio (e.g., 30%), the server 10 may determine that the area is difficult to ride and travel on the personal mobility 20 due to an influence of a surrounding environment, resulting in predicting that the demand level for the personal mobility 20 in the area decreases.

For example, as shown in FIG. 5B and FIG. 5C, the server may identify the usage information including when one user is riding and traveling on the personal mobility 20, and when two or more users are riding and traveling on the personal mobility 20.

In particular, in the area shown in FIG. 5C, when the ratio of the number of personal mobilities 20 on which two or more users are riding to the number of personal mobilities 20 on which one user is riding is greater than or equal to the third ratio (e.g., 20%), the server 10 may determine that two users are riding because the number of personal mobilities 20 is insufficient, resulting in predicting that the demand level for the personal mobility in the area increases.

For example, as shown in FIG. 5B, the server may identify the usage information including the number of personal mobilities 20 slower than the moving speed of the pedestrian and the number of personal mobilities 20 faster than the moving speed of the pedestrian.

In particular, in the area shown in FIG. 5B, when the ratio of the number of personal mobilities 20 that are slower than the moving speed of the pedestrian to the number of personal mobilities 20 that are faster than the moving speed of the pedestrian is greater than or equal to the predetermined second ratio (e.g., 50%), the server 10 may determine that the area is difficult to ride and travel on the personal mobility 20 due to the influence of the surrounding environment, resulting in predicting that the demand level for the personal mobility 20 in the area decreases.

Figure 6:
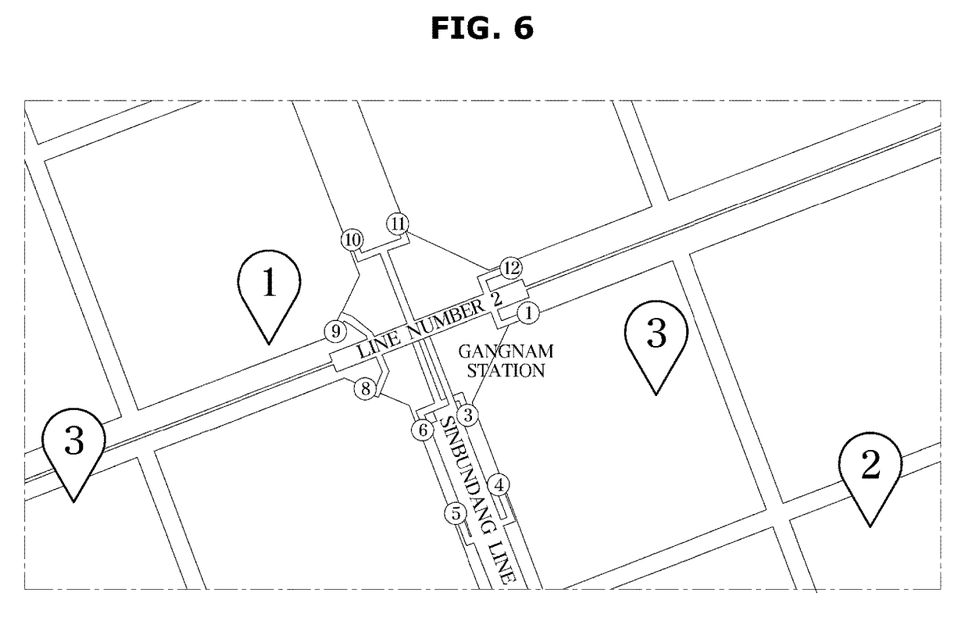
FIG. 6 is a view illustrating a method of displaying a service area setting of a personal mobility according to an embodiment.

FIG. 6 is a view illustrating a method of displaying a service area setting of the personal mobility according to an embodiment.

Referring to FIG. 6, the server 10 may display on the display 120 the number of personal mobilities 20 required in the area where demand level is predicted to increase. The server 10 may display on the display 120 the number of personal mobilities 20 capable of moving from the area where the demand level decreases to the area where the demand level is predicted to increase.

Figure 7:
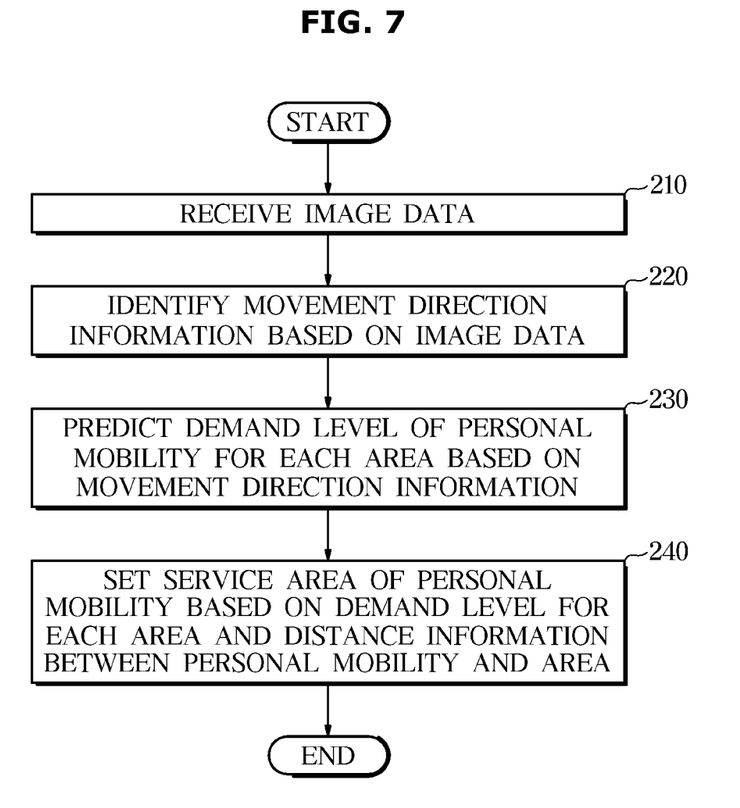
FIG. 7 is a flowchart showing a method for setting a service area of a personal mobility according to an embodiment.

FIG. 7 is a flowchart showing a method for setting a service area of the personal mobility according to an embodiment.

The server 10 may receive image data related to a surrounding situation from the personal mobility 20 (210).

In this case, the server 10 may also receive location information of the personal mobility 20 by using GPS information.

The server 10 may identify movement direction information of the personal mobility 20 based on the image data and the GPS information (220). Herein, the movement direction information may include departure area information and arrival area information of the personal mobility 20.

The server 10 may predict the demand level for the personal mobility 20 for each area based on the movement direction information of the personal mobility 20 (230).

In particular, the server 10 may identify the area to which the personal mobility 20 arrives based on the arrival area information of the personal mobility 20. The server 10 may determine the number of personal mobilities 20 in the area to which the personal mobility 20 arrives, which may be the first area.

The server 10 may compare the number of personal mobilities 20 in which the arrival area is the first area with the predetermined first value.

When the number of personal mobilities 20 in which the arrival area is the first area is greater than the first value, the server 10 may predict that the demand level for the personal mobility 20 in the first area decreases.

Furthermore, the server 10 may identify the area from which the personal mobility 20 departs based on the departure area information of the personal mobility 20. The server 10 may determine the number of personal mobilities 20 in the area from which the personal mobility 20 departs, which may be the second area.

The server 10 may compare the number of personal mobilities 20 in which the departure area is the second area with the predetermined second value.

When the number of personal mobilities 20 in which the departure area is the second area is greater than the second value, the server 10 may predict that the demand level for the personal mobility 20 in the second area decreases.

The server 10 may set the service area of the personal mobility 20 based on the demand level for each area and distance information between the personal mobility 20 and the areas (240).

In particular, the server 10 may identify location information of the personal mobility 20 located in the area where the demand level decreases. The server 10 may determine a distance between the personal mobility 20 located in the area where the demand level decreases and the area where the demand level increases.

The server 10 may set the service area such that the personal mobility 20 having a short distance between the personal mobility 20 located in the area where the demand level decreases and the area where the demand level increases is relocated to an area where the demand increases.

Figure 8:
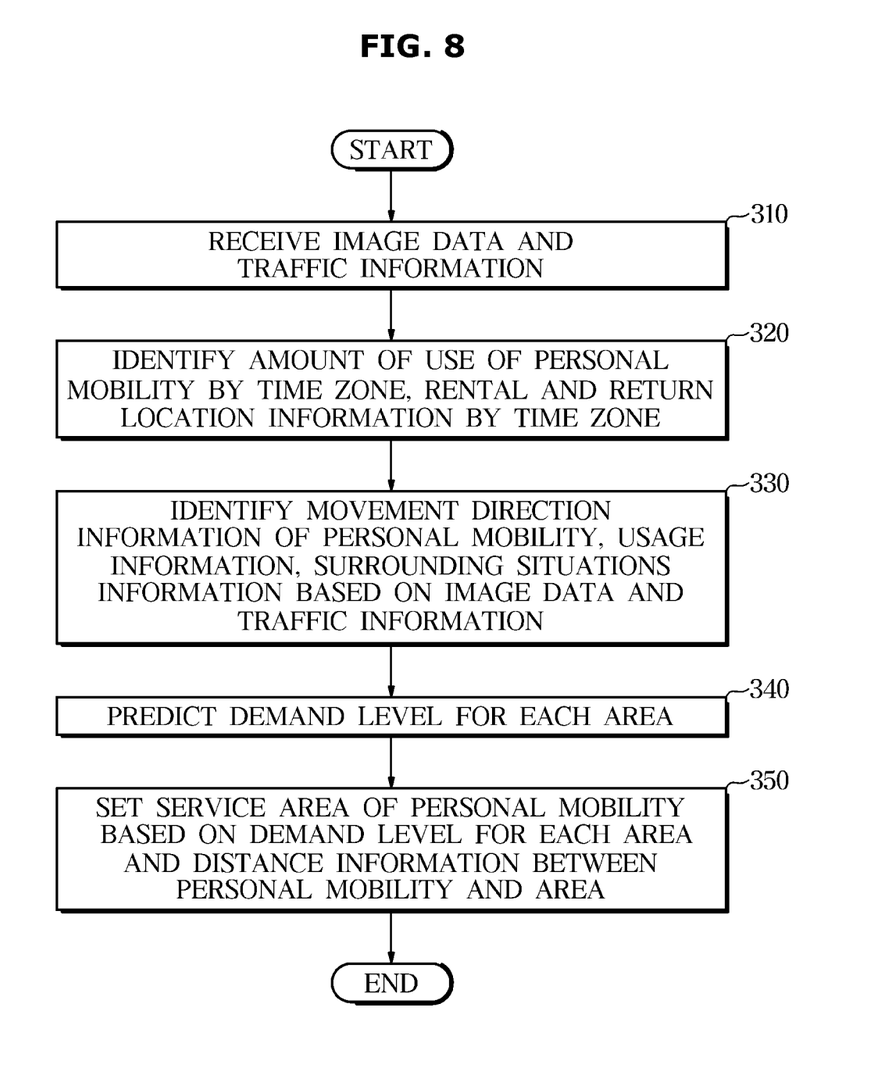
FIG. 8 is a flowchart showing a method for setting a service area of a personal mobility according to another embodiment.

FIG. 8 is a flowchart showing a method for setting a service area of the personal mobility according to another embodiment.

The server 10 may receive image data related to surrounding conditions from the personal mobility 20 and may receive traffic information through the communicator (310).

Herein, the traffic information may include a road traffic volume, a degree of flow, a road congestion situation, a penetration rate of public transportation, a flow amount of public transportation, the number of stops, a location, and the like.

In this case, the server 10 may also receive location information of the personal mobility 20 using the GPS information.

The server 10 may identify an amount of use of the personal mobility 20 by time zone and rental and return location information of the personal mobility 20 by time zone (320).

The server 10 may identify movement direction information of the personal mobility 20, usage information of the personal mobility 20, and surrounding situations information based on the image data, the traffic information, and the GPS information (330).

Herein, the movement direction information may include departure area information and arrival area information of the personal mobility 20.

In this case, the usage information may include at least one of the number of personal mobilities 20 on which users are riding and traveling, the number of personal mobilities 20 that user move without riding, the number of personal mobilities 20 that are slower than a moving speed of the pedestrian, the number of personal mobilities 20 on which one user is riding, and the number of personal mobilities 20 on which two or more users are riding.

Furthermore, the surrounding situations information may include at least one of the number of pedestrians in the area on which the personal mobility 20 is located, the moving speed of pedestrians, the number of vehicles, the speed of the vehicles, and the speed of a bicycle.

The server 10 may predict the demand level for the personal mobility 20 for each area based on at least one of the amount of use of the personal mobility 20 by time zone, the rental and return location information of the personal mobility 20 by time zone, the movement direction information, the usage information, or the surrounding situations information (340).

The server 10 may set the service area of the personal mobility 20 based on the demand level for each area and distance information between the personal mobility 20 and the areas (350).

As is apparent from the above, the embodiments of the present disclosure can accurately determine the area with high demand level so that more users can be secured by using a small number of personal mobilities.

Furthermore, the embodiments can reduce operating cost for collecting personal mobilities in the area with low demand level.

Furthermore, the embodiments can increase users' preference for personal mobilities through demand-tailored services.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable recording medium includes all kinds of recording media in which instructions which can be decoded by a computer are stored, for example, a read only memory (ROM), a random access memory (RAM), a magnetic tape, a magnetic disk, a flash memory, an optical data storage device, and the like.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A server, comprising:
a communicator; and
a processor configured to:
receive image data from a personal mobility through the communicator;
determine movement direction information including departure area information of the personal mobility and arrival area information of the personal mobility based on the image data;
predict a demand level for the personal mobility for each area based on the movement direction information;
set a service area of the personal mobility based on the demand level;
identify usage information of the personal mobility based on the image data, wherein the usage information includes user image and personal mobility image; and
predict the demand level for the personal mobility for each area based on the usage information;
wherein, based on the usage information, the processor is configured to identify a ratio of a number of personal mobilities that users move without riding to a number of personal mobilities on which users are riding and traveling, a ratio of a number of personal mobilities that are slower than a moving speed of a pedestrian to a number of personal mobilities that are faster than the moving speed of the pedestrian, or a ratio of a number of personal mobilities on which two or more users are riding to a number of personal mobilities on which one user is riding.

2. The server of claim 1, wherein the processor is configured to:
identify a number of personal mobilities in a first area at which the personal mobility arrives based on the arrival area information of the personal mobility; and
in response to the identified number of personal mobilities being greater than a first value, predict that the demand level for the personal mobility in the first area decreases.

3. The server of claim 1, wherein the processor is configured to:
identify a number of personal mobilities in a second area from which the personal mobility departs based on the departure area information of the personal mobility; and
in response to the identified number of personal mobilities being greater than a second value, predict that the demand level for the personal mobility in the second area increases.

4. The server of claim 1, further comprising a display, wherein the processor is configured to display the demand level for the personal mobility for each area on the display.

5. The server of claim 1, wherein the processor is configured to:
compare a distance between the personal mobility located in an area where the demand level decreases and at least one area where the demand level increases; and
set the service area of the personal mobility based on the comparison result.

6. The server of claim 1, wherein the processor is configured to:
receive traffic information through the communicator;
identify surrounding situations information of the personal mobility based on the traffic information; and
predict the demand level for the personal mobility for each area based on the surrounding situations information.

7. The server of claim 1, wherein, based on the usage information, the processor is configured to predict that the demand level for the personal mobility decreases in response to:
the ratio of the number of personal mobilities that the users move without riding to the number of personal mobilities on which the users are riding and traveling is greater than or equal to a predetermined first ratio; or
the ratio of the number of personal mobilities that are slower than the moving speed of the pedestrian to the number of personal mobilities that are faster than the moving speed of the pedestrian is greater than or equal to a predetermined second ratio.

8. The server of claim 1, wherein the processor is configured to predict that the demand level for the personal mobility increases in response to the ratio of the number of personal mobilities on which two or more users are riding to the number of personal mobilities on which one user is riding is greater than or equal to a predetermined third ratio.

9. The server of claim 1, wherein the server is configured to predict the demand level for the personal mobility for each area based on an amount of use of the personal mobility by time zone, and rental and return location information of the personal mobility by the time zone.

10. A method of controlling a server, the method comprising:
receiving image data from a personal mobility;
determining movement direction information including departure area information of the personal mobility and arrival area information of the personal mobility based on the image data;
predicting a demand level for the personal mobility for each area based on the movement direction information;
setting a service area of the personal mobility based on the demand level;
identifying usage information of the personal mobility based on the image data, wherein the usage information includes user image and personal mobility image; and
predicting the demand level for the personal mobility for each area based on the usage information;
wherein the predicting the demand level for the personal mobility for each area based on the usage information comprises identifying:
a ratio of a number of personal mobilities that users move without riding to a number of personal mobilities on which users are riding and traveling;
a ratio of a number of personal mobilities that are slower than a moving speed of a pedestrian to a number of personal mobilities that are faster than the moving speed of the pedestrian; or
a ratio of a number of personal mobilities on which two or more users are riding to a number of personal mobilities on which one user is riding.

11. The method of claim 10, further comprising, based on the usage information, predicting that the demand level for the personal mobility decreases in response to:
the ratio of the number of the personal mobilities that the users move without riding to the number of the personal mobilities on which the users are riding and traveling being greater than or equal to a predetermined first ratio; or the ratio of the number of the personal mobilities that are slower than the moving speed of the pedestrian to the number of the personal mobilities that are faster than the moving speed of the pedestrian being greater than or equal to a predetermined second ratio.

12. A method of controlling a server, the method comprising:
receiving image data from a personal mobility;
determining movement direction information including departure area information of the personal mobility and arrival area information of the personal mobility based on the image data;
predicting a demand level for the personal mobility for each area based on the movement direction information; and
setting a service area of the personal mobility based on the demand level;
based on usage information, identifying:
   a ratio of a number of personal mobilities that users move without riding to a number of personal mobilities on which users are riding and traveling;
   a ratio of a number of personal mobilities that are slower than a moving speed of a pedestrian to a number of personal mobilities that are faster than the moving speed of the pedestrian; or
   a ratio of a number of personal mobilities on which two or more users are riding to a number of personal mobilities on which one user is riding.

13. The method of claim 12, further comprising:
identifying a number of personal mobilities in a first area to which the personal mobility arrives based on the arrival area information of the personal mobility; and
predicting that the demand level for the personal mobility in the first area decreases when the identified number of the personal mobilities is greater than a first value.

14. The method of claim 12, further comprising:
identifying a number of personal mobilities in a second area from which the personal mobility departs based on the departure area information of the personal mobility; and
predicting that the demand level for the personal mobility in the second area increases when the identified number of the personal mobilities is greater than a second value.

15. The method of claim 12, further comprising displaying the demand level for the personal mobility for each area.

16. The method of claim 12, further comprising:
comparing a distance between the personal mobility located in an area where the demand level decreases and at least one area where the demand level increases; and
setting the service area of the personal mobility based on the comparison result.

17. The method of claim 12, further comprising:
receiving traffic information;
identifying surrounding situations information of the personal mobility based on the traffic information; and
predicting the demand level for the personal mobility for each area based on the surrounding situations information.

18. The method of claim 12, further comprising, based on the usage information, predicting that the demand level for the personal mobility decreases in response to:
the ratio of the number of the personal mobilities that the users move without riding to the number of the personal mobilities on which the users are riding and traveling being greater than or equal to a predetermined first ratio; or
the ratio of the number of the personal mobilities that are slower than the moving speed of the pedestrian to the number of the personal mobilities that are faster than the moving speed of the pedestrian being greater than or equal to a predetermined second ratio.

* * * * *